US010991024B2

(12) United States Patent
Xin

(10) Patent No.: US 10,991,024 B2
(45) Date of Patent: Apr. 27, 2021

(54) STRUCTURED ITEM ORGANIZING MECHANISM IN E-COMMERCE

(71) Applicant: eBay Inc., San Jose, CA (US)

(72) Inventor: Yingwei Xin, Shanghai (CN)

(73) Assignee: eBay Inc., San Jose, CA (US)

( * ) Notice: Subject to any disclaimer, the term of this patent is extended or adjusted under 35 U.S.C. 154(b) by 125 days.

(21) Appl. No.: 16/217,642

(22) Filed: Dec. 12, 2018

(65) Prior Publication Data

US 2019/0122283 A1    Apr. 25, 2019

Related U.S. Application Data

(63) Continuation of application No. 15/034,266, filed as application No. PCT/CN2015/075690 on Apr. 1, 2015, now Pat. No. 10,169,800.

(30) Foreign Application Priority Data

Apr. 1, 2015 (CN) .......................... 201580079777.4

(51) Int. Cl.
*G06Q 30/00* (2012.01)
*G06Q 30/06* (2012.01)

(52) U.S. Cl.
CPC ......... *G06Q 30/0627* (2013.01); *G06Q 30/06* (2013.01); *G06Q 30/0603* (2013.01);
(Continued)

(58) Field of Classification Search
None
See application file for complete search history.

(56) References Cited

U.S. PATENT DOCUMENTS 8,156,073 B1  4/2012 Dave et al.
8,190,486 B1  5/2012 Ouimet
(Continued)

FOREIGN PATENT DOCUMENTS

CN  101136094 A  3/2008
CN  101206753 A  6/2008
(Continued)

OTHER PUBLICATIONS

Non-Final Office Action received for U.S. Appl. No. 15/034,266, dated Apr. 11, 2018, 13 pages.
(Continued)

*Primary Examiner* — Mila Airapetian
(74) *Attorney, Agent, or Firm* — Holland & Hart LLP

(57) ABSTRACT

Systems and methods for organizing structured items in an e-commerce system are presented. In some aspects, the systems and methods may include a back-end structured item organizing system associated with a front-end category mapping system which is configured to process use case requests. In some aspects, a use case request may identify an item for classification by the back-end structured organizing system. In some aspects, the described systems and methods may select a listing bucket from a set of listing buckets of the back-end structured organizing system based on attribute values indicated in the use case request, and may cause a user interface of the front-end category mapping system to display one or more characteristics associated with items categorized within the selected listing bucket.

20 Claims, 11 Drawing Sheets

(52) U.S. Cl.
CPC ..... *G06Q 30/0621* (2013.01); *G06Q 30/0629* (2013.01); *G06Q 30/0641* (2013.01)

(56) References Cited

U.S. PATENT DOCUMENTS

| | | | |
|---|---|---|---|
| 9,799,000 B2 | 10/2017 | Sethi et al. | |
| 10,169,800 B2 | 1/2019 | Xin | |
| 2007/0143179 A1 | 6/2007 | Eyal et al. | |
| 2012/0041849 A1* | 2/2012 | Blumenthal | G06Q 30/0631 705/27.2 |
| 2014/0258050 A1* | 9/2014 | Abboud | G06Q 10/087 705/28 |
| 2014/0353723 A1 | 12/2014 | Bailaro et al. | |
| 2014/0365338 A1 | 12/2014 | Liu et al. | |
| 2015/0052020 A1 | 2/2015 | Raman et al. | |
| 2018/0033068 A1 | 2/2018 | Xin | |

FOREIGN PATENT DOCUMENTS

| | | |
|---|---|---|
| CN | 101504751 A | 8/2009 |
| CN | 101661594 A | 3/2010 |
| CN | 103207913 A | 7/2013 |
| CN | 103218719 A | 7/2013 |
| CN | 103336796 A | 10/2013 |
| CN | 103593374 A | 2/2014 |
| CN | 108027944 A | 5/2018 |
| WO | 2007/075616 A2 | 7/2007 |
| WO | 2016/154965 A1 | 10/2016 |

OTHER PUBLICATIONS

Notice of Allowance received for U.S. Appl. No. 15/034,266, dated Aug. 27, 2018, 8 pages.
Preliminary amendment filed for U.S. Appl. No. 15/034,266 dated May 4, 2016, 8 pages.
Response to Non-Final Office Action filed Jul. 11, 2018, for U.S. Appl. No. 15/034,266, dated Apr. 11, 2018, 16 pages.
International Preliminary Report on Patentability received for PCT Application No. PCT/CN2015/075690, dated Oct. 12, 2017, 6 pages.
International Search Report received for PCT Patent Application No. PCT/CN2015/075690, dated Jan. 12, 2016, 3 pages.
Written Opinion received for PCT Patent Application No. PCT/CN2015/075690, dated Jan. 12, 2016, 4 pages.

* cited by examiner

STRUCTURED ITEM ORGANIZING MECHANISM IN E-COMMERCE

RELATED APPLICATIONS

This application is a continuation of U.S. application Ser. No. 15/034,266, filed May 4, 2016, which claims the benefit of priority of International Application No. PCT/CN2015/075690, filed Apr. 1, 2015, and claims the benefit of priority to Chinese Application No. 201580079777.4, filed Apr. 1, 2015, each of which is hereby incorporated by, reference in its entirety.

CLAIM OF PRIORITY

This application is a continuation of U.S. application Ser. No. 15/034,266, filed May 4, 2016, which claims the benefit of priority of International Application No. PCT/CN2015/075690, filed Apr. 1, 2015, each of which is hereby incorporated by reference in its entirety.

TECHNICAL FIELD

Embodiments of the present disclosure relate generally to data storage and, more particularly, but not by way of limitation, to product storage database.

BACKGROUND

The rise in electronic and digital device technology has rapidly changed the way society interacts with media and consumes goods and services. Digital technology enables a variety of consumer devices to be available that are very flexible and relatively cheap. Specifically, modern electronic devices, such as smart phones and tablets, allow a user to have access to a variety of useful applications even when away from a traditional computer. One useful application is the selling and buying of products and services through computer networks.

Networked based commerce systems, or other parties interesting in selling products over computer networks, need to store large amounts of data for the many products they sell. Some networked based commerce systems organize that data based on product designations that already govern more traditional stores (known as product based systems). However, other networked based commerce systems instead use product organization schemes that are intended make finding or adding a product as easy as possible for a user of the system (known as listing based systems). Each system provides advantages and disadvantages.

BRIEF DESCRIPTION OF THE DRAWINGS

Various ones of the appended drawings merely illustrate example embodiments of the present disclosure and cannot be considered as limiting its scope.

Figure 1:
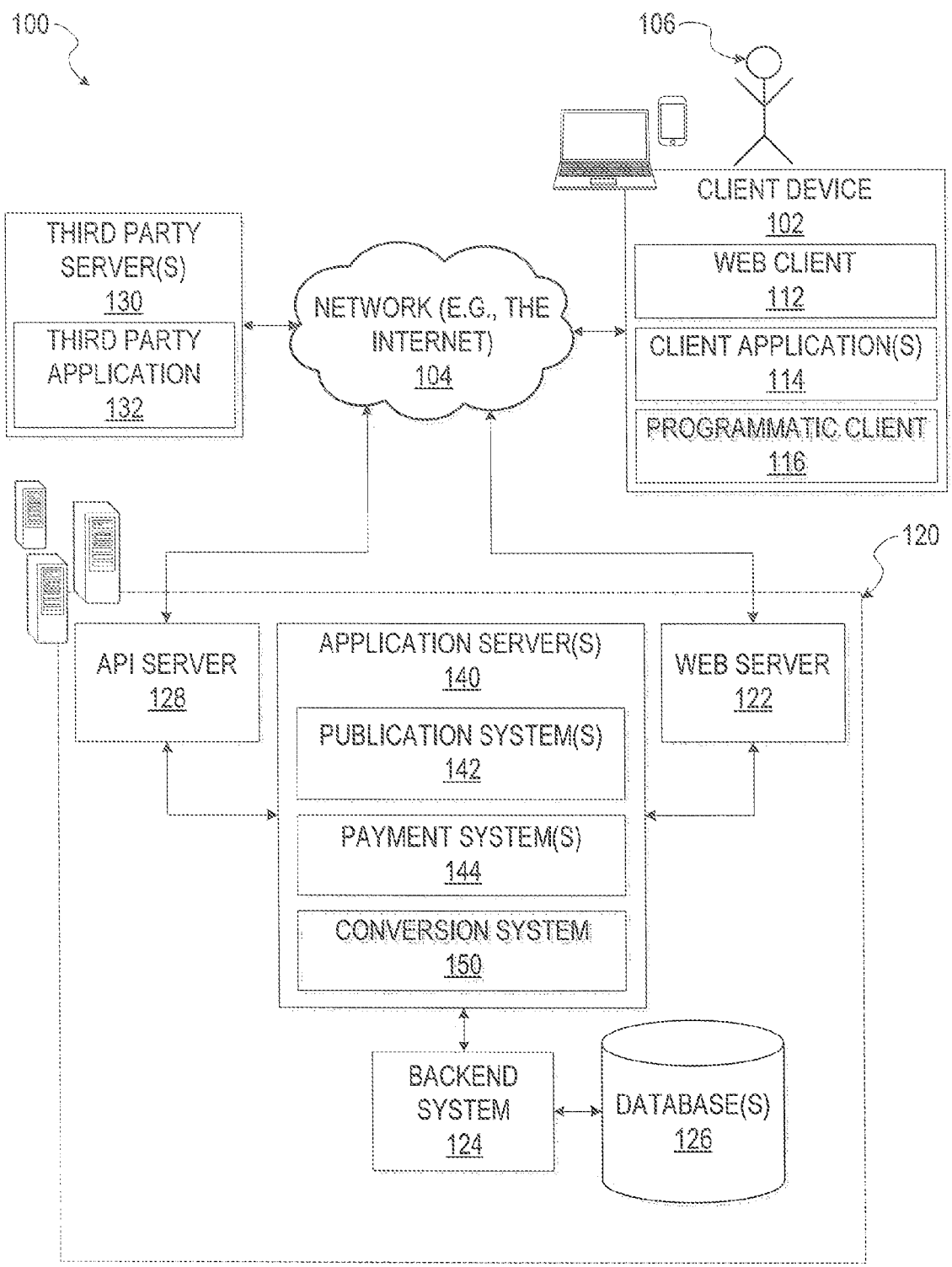
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In some example embodiments, a network based commerce system would prefer to have the advantages of a listing system (listing systems can cover all types of items (especially rare or unusual items in a long-tail, prioritizes customer ease of use, can be customized based on different country or user preferences, has a high-level catalog that is easy for users to navigate) and a product system (which prioritizes ease of organization and efficiency). A networked based commerce system can use both systems if a method exists for integrating the two systems.

In some example embodiments, a server system (e.g., a server system that operates a network-based server system) receives a request to list a specific product at the server system. In some example embodiments, the request includes a name of the product or other short description of the product. The server system classifies the product based on this information into a back-end category (e.g., a product category that is part of the product inventory system used to organize product information in a way that is not transparent to a user of the network-based commerce system) on the information received with the request. Each item is only associated with a single back-end category.

In some example embodiments, each back-end category (e.g., sometimes known as an abstract product category) represents one specific function or a few related functions for systems that integrate multiple functions. For example, home theater systems or washer-dryer systems often incorporate more than one system and may have their own back-end categories. In some example embodiments, each back-end category represents one general form or a set of forms (e.g., "Shoes" which covers all types or forms of dress and casual shoes for men and women but not boots, sandals, sneakers, and slippers).

In some example embodiments, each back-end product category is already mapped to one or more specific categories in the front-end category. For example, if the back-end category is regulation sized men's basketballs, the front end category may be as general as "sports equipment." In some example embodiments, a back-end category is related to more than one front end category. For example, the back-end category is "full size microwave ovens" and is related to both the "appliance" category and the "electronic equipment" category. In some example embodiments, a particular product may be listed in multiple front-end categories based on user request (e.g., paying extra to be listed in multiple categories and thus raise the change of being seen.)

In some example embodiments, back-end categories are arranged in parallel so there is no overlap between back-end categories. In contrast, front-end categories are arranged in a hierarchy such that a single item can belong to multiple categories.

In some example embodiments, the server system then determines one or more attributes associated with the product based on the back-end category and/or front-end category with which the product is associated. Each product type will have a distinct set of attributes depending on the product. For example, a shoe will have a set of attributes including shoe size, color, material, brand, weight, price, and country of origin. A microwave oven will have a different set of attributes including, but not limited to, size, power, input type, weight, and so on.

In some example embodiments, once a set of attributes are determined, the server system will determine whether one or more of the attributes can be automatically given a known value. For example, if the brand and model of a television set is known based on the information provided by the user, many of the attributes of the television can be automatically filled in based on stored data for that product. In some example embodiments, the server system will prompt the user to enter any attributes that cannot be automatically filled in.

In some example embodiments, the listing or entry is then stored in the database associated with the backend system along with all item attribute information (including attribute information supplied by the user.)

In some example embodiments, the server system receives a request to use the product information stored in the backend database. For example, the server system receives a request for products similar to a known product. The server system uses the stored data to identify products that are similar to the known product based on the attributes associated with the known product. In some example embodiments, these requests are received from another component of the server system (e.g., the search module or the advertising module).

In some example embodiments, the server system analyzes the attributes associated with the known product (and the values associated with the product). In some example embodiments, the server system selects one or more attribute values and then selects back-end product categories that include the one or more selected attribute values. All the selected back-end product categories can then be grouped into a bucket for the specific request.

With reference to FIG. 1, an example embodiment of a high-level client-server-based network architecture 100 is shown. A server system 120, in the example forms of a network-based marketplace or payment system, provides server-side functionality via a network 104 (e.g., the Internet or wide area network (WAN)) to one or more client device 102. FIG. 1 illustrates, for example, a web client 112 (e.g., a browser, such as the Internet Explorer® browser developed by Microsoft® Corporation of Redmond, Wash. State), client application(s) 114, and a programmatic client 116 executing on client device 102.

The client device 102 may comprise, but is not limited to, a desktop computer, mobile phone, laptop, portable digital assistant (PDA), smart phone, tablet, ultra-book, netbook, laptop, multi-processor system, microprocessor-based or programmable consumer electronics, game console, set-top box, or any other communication device that a user, such as user 106, may utilize to access the server system 120. In some embodiments, the client device 102 may comprise a display module (not shown) to display information (e.g., in the form of user interfaces). In further embodiments, the client device 102 may comprise one or more of a touch screen, accelerometer, gyroscope, camera, microphone, global positioning system (GPS) device, and so forth. The client device 102 may be a device of a user 106 that is used to perform a transaction involving digital items within the server system 120. In one embodiment, the server system 120 is a network-based marketplace that responds to requests for product listings, publishes publications comprising item listings of products available on the network-based marketplace, and manages payments for these marketplace transactions. One or more users 106 may be a person, a machine, or other means of interacting with the client device 102. In embodiments, the user 106 is not part of the network architecture 100, but may interact with the network architecture 100 via the client device 102 or another means. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 102 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given client device 102, then this application is configured to locally provide the user interface and at least some of the functionalities with the application configured to communicate with the server system 120, on an as needed basis, for data and/or processing capabilities not locally available (e.g., access to a database of items available for sale, to authenticate a user, to verify a method of payment, etc.). Conversely if the e-commerce site application is not included in the client device 102, the client device 102 may use its web browser to access the e-commerce site (or a variant thereof) hosted on the server system 120.

One or more users 106 may be a person, a machine, or other means of interacting with the client device 102. In example embodiments, the user 106 is not part of the network architecture 100, but may interact with the network architecture 100 via the client device 102 or other means. For instance, the user 106 provides input (e.g., touch screen input or alphanumeric input) to the client device 102 and the input is communicated to the server system 120 via the network 104. In this instance, the server system 120, in response to receiving the input from the user 106, communicates information to the client device 102 via the network 104 to be presented to the user 106. In this way, the user 106 can interact with the server system 120 using the client device 102.

An application program interface (API) server 128 and a web server 122 are coupled to, and provide programmatic and web interfaces respectively to, one or more application server 140. The application server(s) 140 may host one or more publication system 142 and payment system 144, each of which may comprise one or more modules or applications and each of which may be embodied as hardware, software, firmware, or any combination thereof. The application server(s) 140 are, in turn, shown to be coupled to one or more back-end database server 124 that facilitates access to one or more information storage repositories or database(s) 126. In an example embodiment, the database(s) 126 are storage devices that store information to be posted (e.g., publications or listings) to the publication system(s) 142. The database(s) 126 may also store digital item information in accordance with example embodiments.

Additionally, a third party application 132, executing on third party server(s) 130, is shown as having programmatic access to the server system 120 via the programmatic interface provided by the API server 128. For example, the third party application 132, utilizing information retrieved from the server system 120, supports one or more features or functions on a website hosted by the third party. The third party website, for example, provides one or more promotional, marketplace, or payment functions that are supported by the relevant applications of the server system 120.

The publication system(s) 142 may provide a number of publication functions and services to users 106 that access the server system 120. The payment system(s) 144 may likewise provide a number of functions to perform or facilitate payments and transactions. While the publication system(s) 142 and payment system(s) 144 are shown in FIG. 1 to both form part of the server system 120, it will be appreciated that, in alternative embodiments, each system 142 and 144 may form part of a payment service that is separate and distinct from the server system 120. In some embodiments, the payment system(s) 144 may form part of the publication system(s) 142.

In some example embodiments, the conversion system 150 provides functionality operable to enable two systems, a front-end user facing system optimized for usability, and a back-end item data storage system optimized for flexibility, to both use listing and item data to provide the best possible services. In some example embodiments, a user 106 will send a request to list an item on the e-commerce site associated with server system 120. The conversion system 150 receives the item listing request and determines a backend product category in which to place the item associated with the item listing request. In some example embodiments, this determination is made based on information about the item included in the item listing request including a but not limited to, an item title, an item description, an item image, and item specifications.

In some example embodiments, once the conversion system 150 has identified a back-end product category that matches the item associated with the received item listing request, the conversion system 150 determines whether the back-end product category is already mapped to a front-end category (e.g., a category in a live catalog). In some example embodiments, the specific front end categories that a back-end category is matched with depend on the country/countries in which the item will be offered or originated. For example, American football related products may be organized into more specific categories (e.g., by team) when selling in American, where American football is more popular. When selling in a country where American Football is less popular (e.g., Germany) far fewer categories are needed (one single category or grouped in with general sports related merchandise).

In some example embodiments, once a front-end category (or categories) is determined, the conversion system 150 displays a list of possible products to the user 106. The user 106 then selects the matching product (or best matching product) and transmits that information to the server system (e.g., server system 120 in FIG. 1). The conversion system 150 determines one or more product attributes associated with the item. The specific attributes associated with an item are determined based on the item's type, use, and information stored about its product category. For example, the attributes associated with a pair of shoes (e.g., size, color, brand, year, whether it has laces or not) are significantly different from those associated with a flat screen television (pixel density, size, display technology, port types, and so on).

In some example embodiments, the conversion system 150 analyzes the list of attributes selected for the item and automatically fills in the values of one or more item attributes based on information stored in the data base about the back-end product category. In some example embodiments, one or more item attribute values are still unknown and the conversion system 150 prompts the user 106 to provide them.

In some example embodiments, once the attribute values are provided, the conversion system 150 then stores the item listing in the back-end system. The information stored in the back-end system database can then be used as necessary by the server system 120.

Further, while the client-server-based network architecture 100 shown in FIG. 1 employs a client-server architecture, the present subject matter is of course not limited to such an architecture, and could equally well find application in a distributed, or peer-to-peer, architecture system, for example. The various publication system(s) 142, payment system(s) 144, and conversion system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 128. The programmatic client 116 may, for example, be a seller application (e.g., the Turbo Lister application developed by eBay® Inc., of San Jose, Calif.) to enable sellers to author and manage listings on the server system 120 in an off-line manner, and to perform batch-mode communications between the programmatic client 116 and the server system 120.

Additionally, a third party application(s) 132, executing on a third party server(s) 130, is shown as having programmatic access to the server system 120 via the programmatic interface provided by the API server 128. For example, the third party application 132, utilizing information retrieved from the server system 120, may support one or more features or functions on a website hosted by the third party. The third party website may, for example, provide one or more promotional, marketplace, or payment functions that are supported by the relevant applications of the server system 120.

Figure 2:
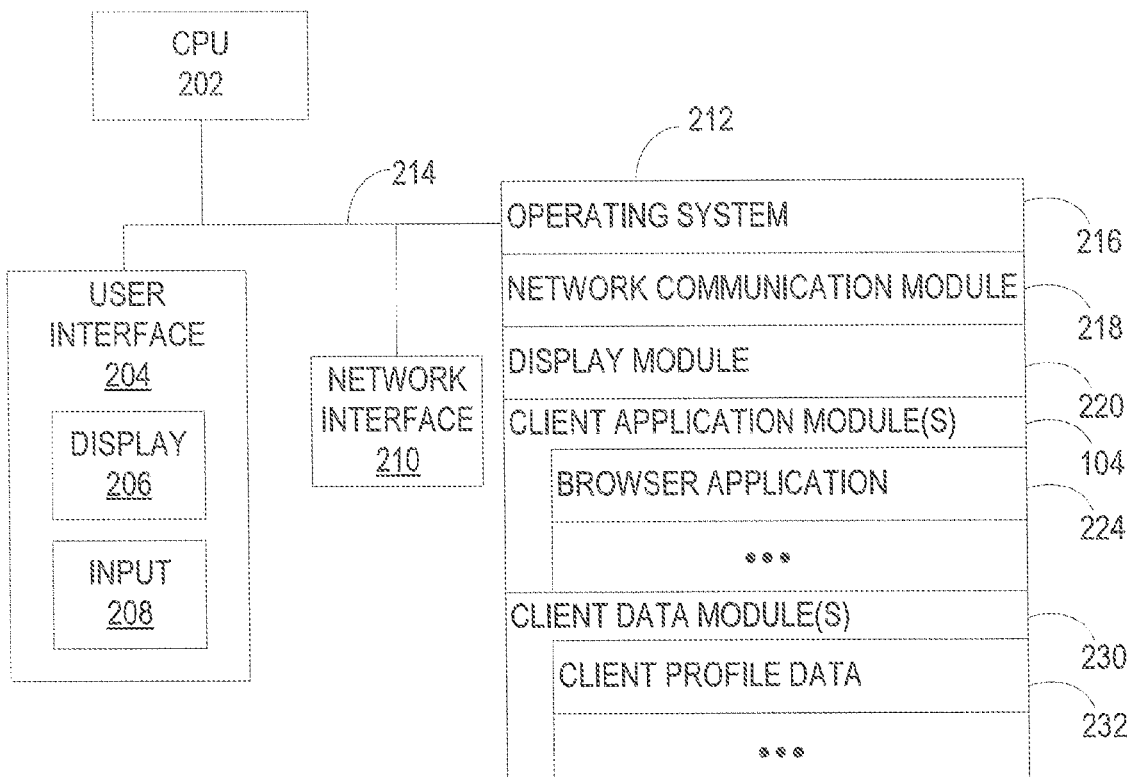
FIG. 2 is a block diagram further illustrating the client device of FIG. 1, in accordance with some example embodiments.

FIG. 2 is a block diagram further illustrating the client device 102, in accordance with some example embodiments. The client device 102 typically includes one or more central processing unit (CPU) 202, one or more network interface 210, memory 212, and one or more communication bus 214 for interconnecting these components. The client device 102 includes a user interface 204. The user interface 204 includes a display device 206 and optionally includes an input means such as a keyboard, mouse, a touch sensitive display, or other input buttons 208. Furthermore, some client devices 102 use a microphone and voice recognition to supplement or replace the keyboard.

Memory 212 includes high-speed random access memory, such as dynamic random-access memory (DRAM), static random access memory (SRAM), double data rate random access memory (DDR RAM) or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, comprise(s) a non-transitory computer-readable storage medium.

In some example embodiments, memory 212, or the computer-readable storage medium of memory 212, stores the following programs, modules, and data structures, or a subset thereof:
- an operating system 216 that includes procedures for handling various basic system services and for performing hardware-dependent tasks;
- a network communication module 218 that is used for connecting the client device 102 to other computers via the one or more communication network interfaces 210 (wired or wireless) and one or more communication networks 104, such as the Internet, other WANs, LANs, metropolitan area networks (MANs), etc.;
- a display module 220 for enabling the information generated by the operating system 216 and client application(s) 114 to be presented visually on the display device 206;
- one or more client application module 104 for handling various aspects of interacting with the server system 120 (FIG. 1), including but not limited to:
  - a browser application 224 for requesting information from the server system 120 (e.g., content items and listings) and receiving responses from the server system 120; and
- client data module(s) 230 for storing data relevant to the clients, including but not limited to:
  - client profile data 232 for storing profile data related to a user (e.g., user 106) of the server system 120 associated with the client device 102.

Figure 3:
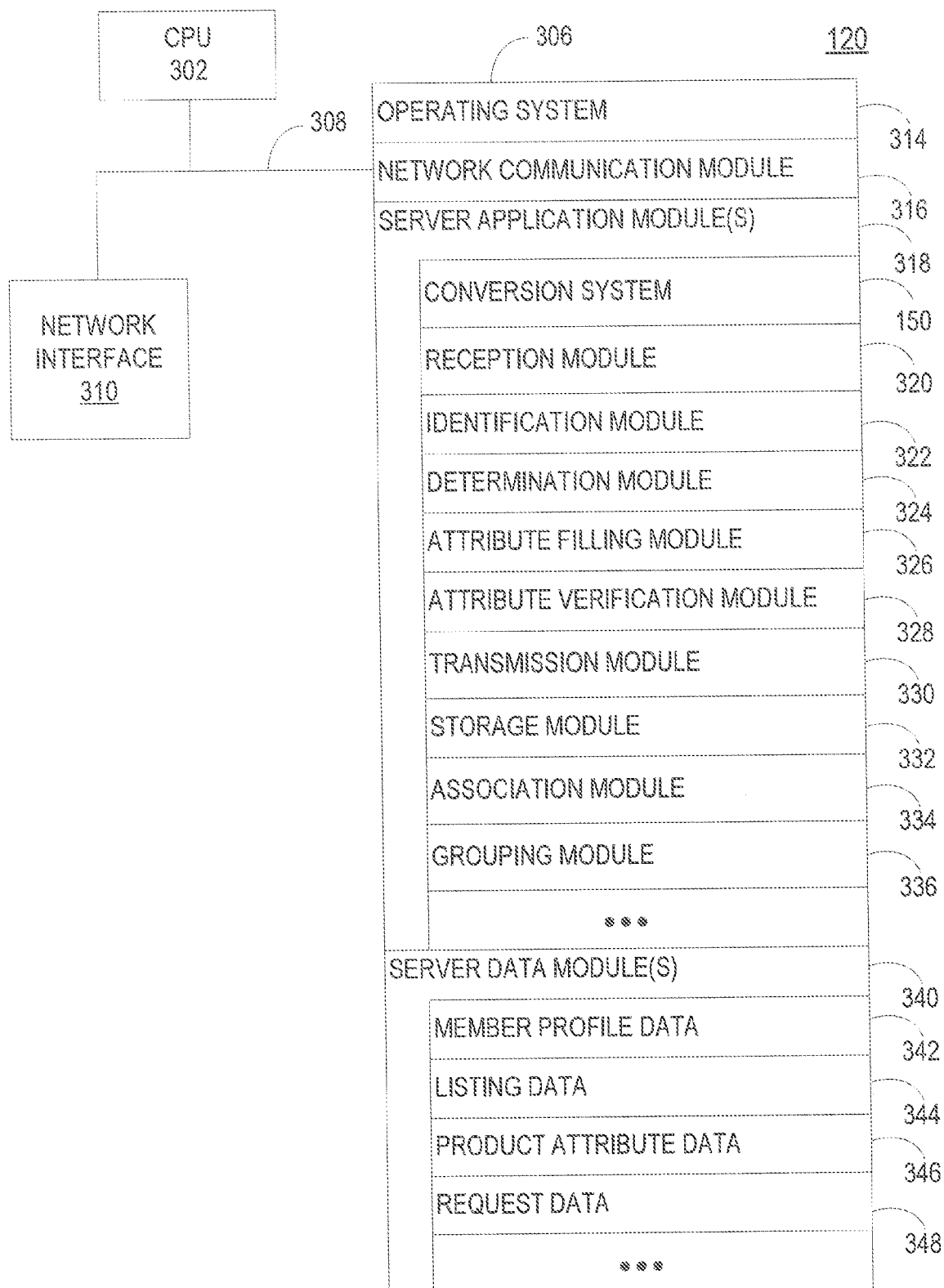
FIG. 3 is a block diagram further illustrating the server system of FIG. 1, in accordance with some example embodiments.

FIG. 3 is a block diagram further illustrating the server system 120 in accordance with some example embodiments. The server system 120 typically includes one or more CPU 302, one or more network interface 310, memory 306, and one or more communication bus 308 for interconnecting these components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302.

Memory 306, or alternately the non-volatile memory device(s) within memory 306, comprises a non-transitory computer-readable storage medium. In some example embodiments, memory 306, or the computer-readable storage medium of memory 306, stores the following programs, modules, and data structures, or a subset thereof:
- an operating system 314 that includes procedures for handling various basic system services and for performing hardware-dependent tasks;
- a network communication module 316 that is used for connecting the server system 120 to other computers via the one or more communication network interface 310 (wired or wireless) and one or more communication network 104, such as the Internet, other WANs, LANs, MANs, and so on;
- one or more server application module 318 for performing the services offered by the server system 120, including but not limited to:
  - a conversion system 150 for receiving listing information from a client system (e.g., client system 102 in FIG. 1) and then converting the listing information to be stored in a back-end product listing system;
  - a reception module 320 for receiving a request to list a respective item at an e-commerce websites associated with the server system 120;
  - an identification module 322 for identifying attributes associated with that particular item or class of items, such as the attributes used to defined a pair of shoes (shoe size, brand, cost, color, material, manufacture date, country of origin, and so on);
  - a determination module 324 for determining a back-end category (e.g., an abstract product category) associated with a particular item included in a request to list the particular item at an e-commerce website using information received as part of the request;
  - an attribute filling module 326 for automatically assigning values to one or more attributes associated with an item based on information stored in a database associated with the server system 120;
  - an attribute verification module 328 for requesting values to be associated with one or more attributes associated with the item from a user associated with a client system (e.g., client system 102 in FIG. 1) by transmitting a prompt to the client system (e.g., client system 102 in FIG. 1) including the attributes for which information is needed and receiving user inputted values for the attribute;
  - a transmission module 330 for transmitting a list of possible products to the client system (e.g., client system 102 in FIG. 1);
  - a storage module 332 for storing information (including known attribute information) for a plurality of items (or products));
  - an associated module 334 for determining, based on the back-end category (and potentially the associated front-end categories), one or more attributes associated with a respective item to be listed on an e-commerce website; and
  - a grouping module 336 for determining, based on a received request that specifies one or more item attributes, a list of items that match the specified one or more items attributes; and server data module(s) 340, holding data related to server system 120, including but not limited to:

member profile data 342 including both data provided by the member who will be prompted to provide some personal information, such as his or her name, age (e.g., birth date), gender, interests, contact information, home town, address, educational background (e.g., schools, majors, etc.), current job title, job description, industry, employment history, skills, professional organizations, memberships to other social networks, customers, past business relationships, and seller preferences; and inferred member information based on member activity, social graph data, remaining power threshold value, and so on;

listing data 344 for storing listing information for a plurality of items for an e-commerce website associated with the server system;

product attribute data 346 including data describing for each back-end and front end category, the attributes associated with each item that may be submitted for listing; and request data 348 for storing data included in a request for information including, but not limited to, the attribute values that define a product type or group requested by another party.

Figure 4:
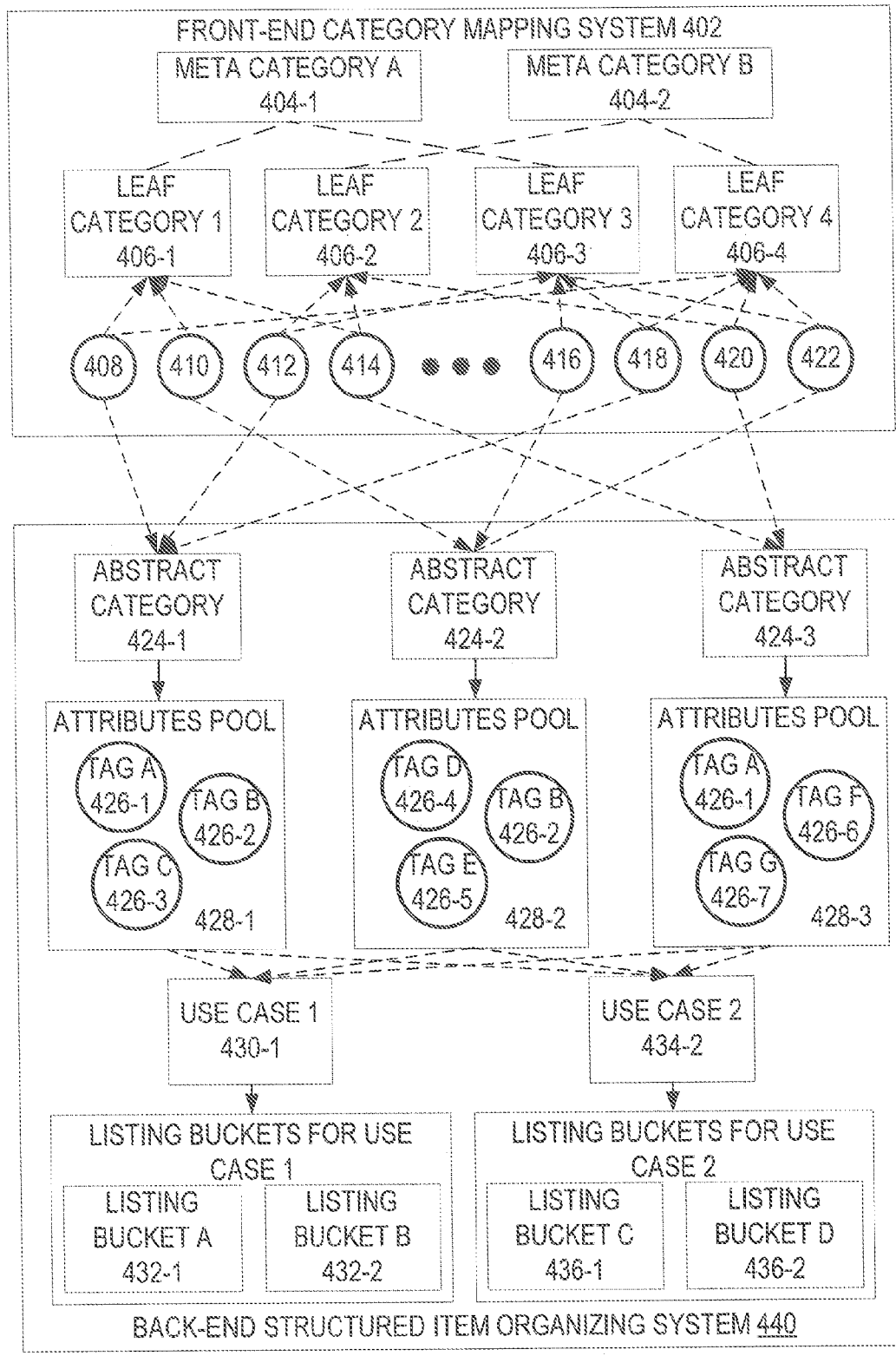
FIG. 4 depicts a block diagram of an exemplary data structure for a content item request, in accordance with some example embodiments.

FIG. 4 depicts a block diagram of a system for converting product or item listings from a front-end listing based system to a back-end item (or product) based system. In some example embodiments, a front-end category mapping system 402 includes a plurality of items (nodes 408-422) grouped into a plurality of leaf categories (categories 406-1 to 406-4). The leaf categories (406-1 to 406-4) are themselves grouped into a plurality of meta categories meta category A 404-1 and meta category B 404-2).

In this figure, and throughout the specification, reference will be made to front-end systems and inventory management categories and back-end systems and inventory management categories. Generally, front-end systems refer to the systems and categories that are user facing and that govern the way a user can interact with a system. These front-end systems allow for cultural, linguistic, and legal differences to shape categories and item listings. Back-end systems, in this case, refer to a product based system that is able to respond to requests efficiently and without duplication.

For example, a user accesses the front-end category mapping system 402 by accessing the website associated with the e-commerce system through the server system (e.g., server system 120 in FIG. 1). The website includes one or more meta-category links (e.g., hypertext links to pages associated with a specific meta-category. Meta-categories are general item or product categories such as "motors," "Fashion," and "Electronics." In some example embodiments, once the user selects a link associated with the one or more meta-categories, a page displaying one or more leaf categories associated with the selected meta-category. In some example embodiments, every item stored with the database associated with the server system (e.g., server system 120 in FIG. 1) is stored hierarchically based on the specific meta-categories and leaf categories the items (e.g., 408-422) are associated with.

In some example embodiments, each item can be associated with more than one leaf category 406 and thus with more than one meta-category 404. For example, a bicycle pump can be stored as bicycle equipment and sports equipment (e.g., to use for inflating sports balls).

In some example embodiments, the back-end structured organizing system 440 includes a classification system for mapping items in the front-end category mapping system 402 to the appropriate section of the back-end structured organizing system 440. In some example embodiments, each item (408-422) is mapped to a single abstract category (e.g., back-end categories 424-1 to 424-3). In some example embodiments, the item is mapped to the single abstract category based on received information about the item including, but not limited to, the title or name of the item, a description of the item, an image of the item, or information about the attributes or qualities of the items.

In some example embodiments, for a respective item in an abstract category 424, the server system (e.g., server system 120 in FIG. 1) determines a set of attributes (e.g., attribute pool 428-1 to attribute pool 428-3) associated with the respective item. In some example embodiments, the abstract category 424-1 has an established attribute pool 428-1. In other example embodiments, the server system (e.g., server system 120 in FIG. 1) uses the one or more leaf categories to determine the appropriate attributes for the respective item. For example, a computer processor would include the brand, the clock speed, the price, the on-chip memory amount, and so on. These attributes would be inappropriate for a painting.

In some example embodiments, the server system (e.g., server system 120 in FIG. 1) uses stored information to automatically assign values to one or more attribute associated with the respective item. In some example embodiments, the server system (e.g., server system 120 in FIG. 1) sends a prompt to a client system (e.g., client system 102 in FIG. 1) to determine attribute values for any attributes that cannot be filled in automatically.

In some example embodiments, the server system (e.g., server system 120 in FIG. 1) receives a use case request (e.g., use case 1 430-1 and use case 2 434-2) that includes a list of attributes and associated values. The server system (e.g., server system 120 in FIG. 1) then creates listing buckets for each different use case (e.g., listing buckets A (432-1), B (432-2), C (436-1), and D (436-2)). Each listing bucket will then include any item that matches the received attribute values. In this way the server system (e.g., server system 120 in FIG. 1) can then determine average prices, similar items, and so on.

Figure 5:
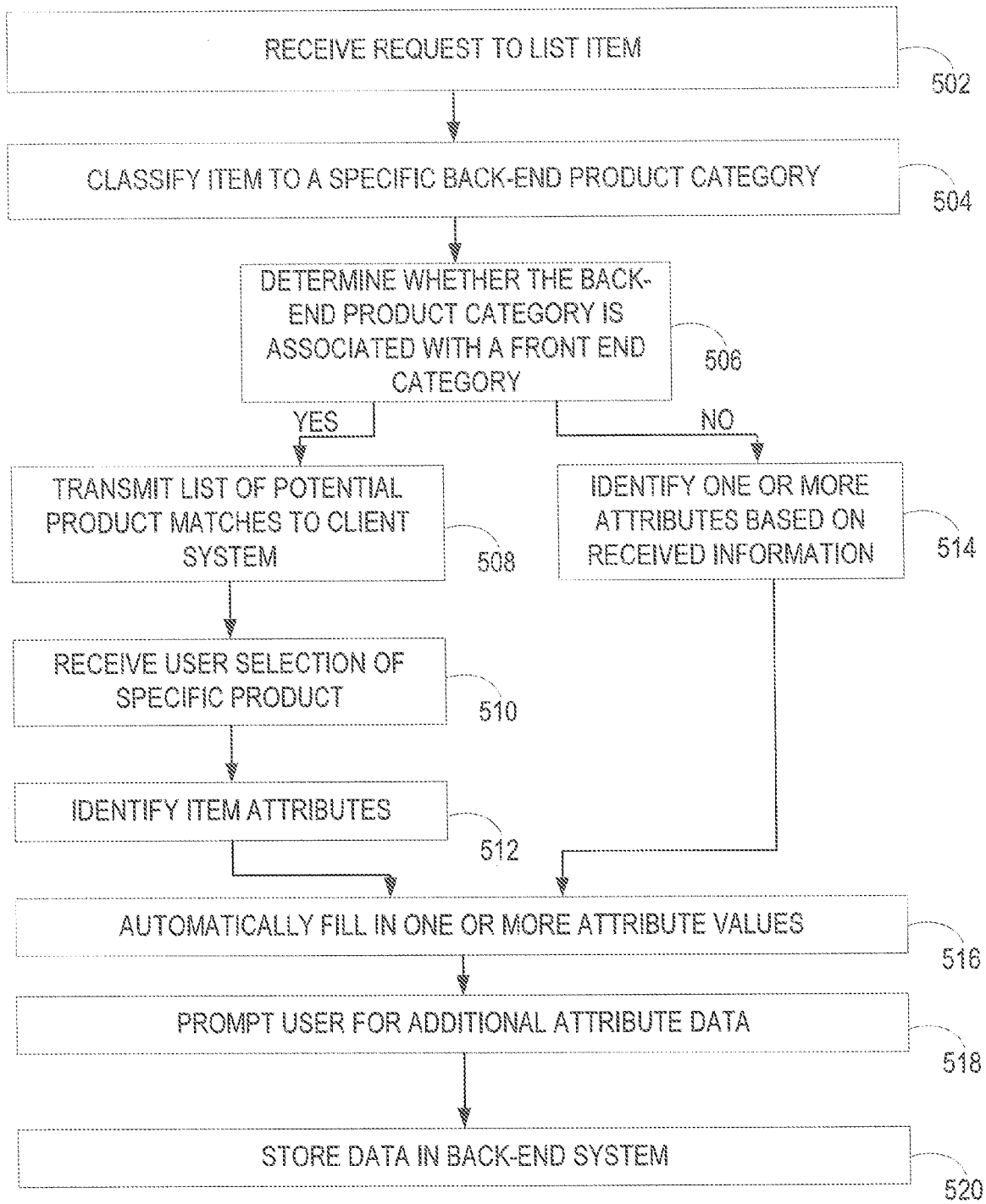
FIG. 5 is a flow diagram illustrating a method, in accordance with some example embodiments, for organizing item listings in an efficient product listing system.

FIG. 5 is a flow diagram illustrating a method, in accordance with some example embodiments, for organizing item listings in an efficient product listing system. Each of the operations shown in FIG. 5 may correspond to instructions stored in a computer memory or computer-readable storage medium. Optional operations are indicated by dashed lines (e.g., boxes with dashed-line borders). In some embodiments, the method described in FIG. 5 is performed by the server system (e.g., server system 120 in FIG. 1). However, the method described can also be performed by any other suitable configuration of electronic hardware.

In some embodiments the method is performed at a server system (e.g., server system 120 in FIG. 1) including one or more processors and memory storing one or more programs for execution by the one or more processors.

In some example embodiments, the server system (e.g., server system 120 in FIG. 1) receives (502) a request to list an item in the e-commerce site associated with the server system (e.g., server system 120 in FIG. 1). In some example embodiments, the request includes additional information such as a title, item description, an image, and so on.

In some example embodiments, the server system (e.g., server system 120 in FIG. 1) classifies (504) the item to identify a specific back-end product category (e.g., an abstract category). In some example embodiments, the server system (e.g., server system 120 in FIG. 1) uses information included in the request to determine the associated or specific back-end product category.

In some example embodiments, the server system (e.g., server system 120 in FIG. 1) determines (506) whether the back-end product category is associated with the front-end (e.g., user interface) system. In some example embodiments, in accordance with a determination that the back-end product category is associated with a front end, the server system (e.g., server system 120 in FIG. 1) transmits (508) a list of potential product matches to the client system (e.g., client system 102 in FIG. 1). For example, the server system (e.g., server system 120 in FIG. 1) identifies a list of potential product matches based on the identified front-end category.

In some example embodiments, the server system (e.g., server system 120 in FIG. 1) receives (510) the user selection of the specific product that matches the item submitted by the user. For example, the server system (e.g., server system 120 in FIG. 1) sends a list of 3-D printers made by a specific company and the user can choose the specific model/SKU that matches the item the user wants to list on the server system (e.g., server system 120 in FIG. 1).

In some example embodiments, in accordance with a determination that the back-end product category is not already associated with a front end category, the server system (e.g., server system 120 in FIG. 1) identifies one or more attributes based on the received information.

In some example embodiments, the server system (e.g., server system 120 in FIG. 1) uses the specific product identified by the user to identify (512) one or more item attributes attributes describing the qualities of an item). In some example embodiments, the server system (e.g., server system 120 in FIG. 1) automatically fills (516) out values for the one or more identified item attributes based on information known about the item/product and stored in a database at the server system (e.g., server system 120 in FIG. 1).

In some example embodiments, there are some attribute values that are not stored in the known data about an item (or that very from item to item even within its narrow back-end system category). In this case, the server system (e.g., server system 120 in FIG. 1) sends a prompt (518) to the client system (e.g., client system 102 in FIG. 1) requesting the user to transmit the needed information for the one or more item attributes. In some example embodiments, the prompt also includes one or more suggested values (e.g., a suggested value already filled into the form or a list of suggested values in a drop down).

In some example embodiments, the server system (e.g., server system 120 in FIG. 1) receives the additional value information from the client system (e.g., client system 102 in FIG. 1) in response to the transmitted prompt.

In some example embodiments, the server system (e.g., server system 120 in FIG. 1) then stores (520) the information in the back-end system.

Figure 6:
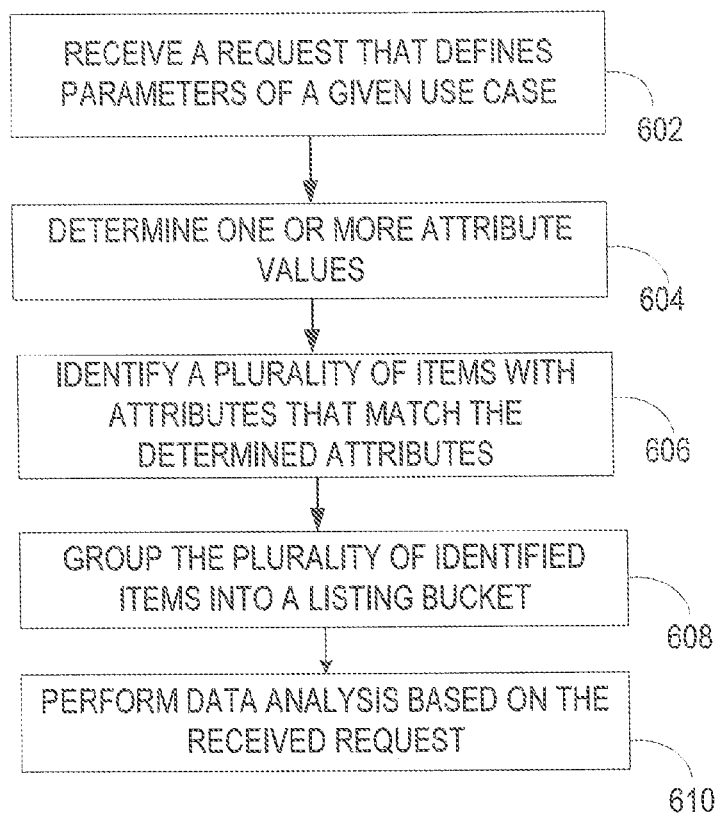
FIG. 6 is a flow diagram illustrating a method, in accordance with some example embodiments, for organizing item listings in an efficient product listing system.

FIG. 6 is a flow diagram illustrating a method, in accordance with some example embodiments, for responding to specific use case requests using item data stored in a flexible product based system. Each of the operations shown in FIG. 6 may correspond to instructions stored in a computer memory or computer-readable storage medium. Optional operations are indicated by dashed lines (e.g., boxes with dashed-line borders). In some embodiments, the method described in FIG. 6 is performed by the server system (e.g., server system 120 in FIG. 1). However, the method described can also be performed by any other suitable configuration of electronic hardware.

In some embodiments the method is performed at a server system (e.g., server system 120 in FIG. 1) including one or more processors and memory storing one or more programs for execution by the one or more processors.

In some example embodiments, the server system (e.g., server system 120 in FIG. 1) receives (602) a request for data analysis based on the use case defined in the request. In some example embodiments, the request itself defines the use case by including one or more parameters identifying the type of items to be analyzed and the type of analysis to conduct.

In some example embodiments, the server system (e.g., server system 120 in FIG. 1) uses the information included in the request to determine (604) one or more attribute values that are included with the request. For example, the request is for the average price (or the median price) of all blue basketball shoes with women's size 9 made by Nike.

In some example embodiments, the server system (e.g., server system 120 in FIG. 1) then identifies (606) a plurality of times with attributes that match the determined attributes. In some example embodiments, the server system (e.g., server system 120 in FIG. 1) groups (608) the identified items into a listing bucket (e.g., a data structure that can include all items matching a certain set of attributes.) For example, the server system (e.g., server system 120 in FIG. 1) identifies all shoes that match a set of attributes (e.g., color=blue, type=basketball, brand=Nike), and places all identified items in a "use case bucket."

In some example embodiments, the server system (e.g., server system 120 in FIG. 1) performs data analysis based on the received request. For example, the request specified that the analysis should be to determine the average price for an item matches a given set of attributes.

Figure 7A:
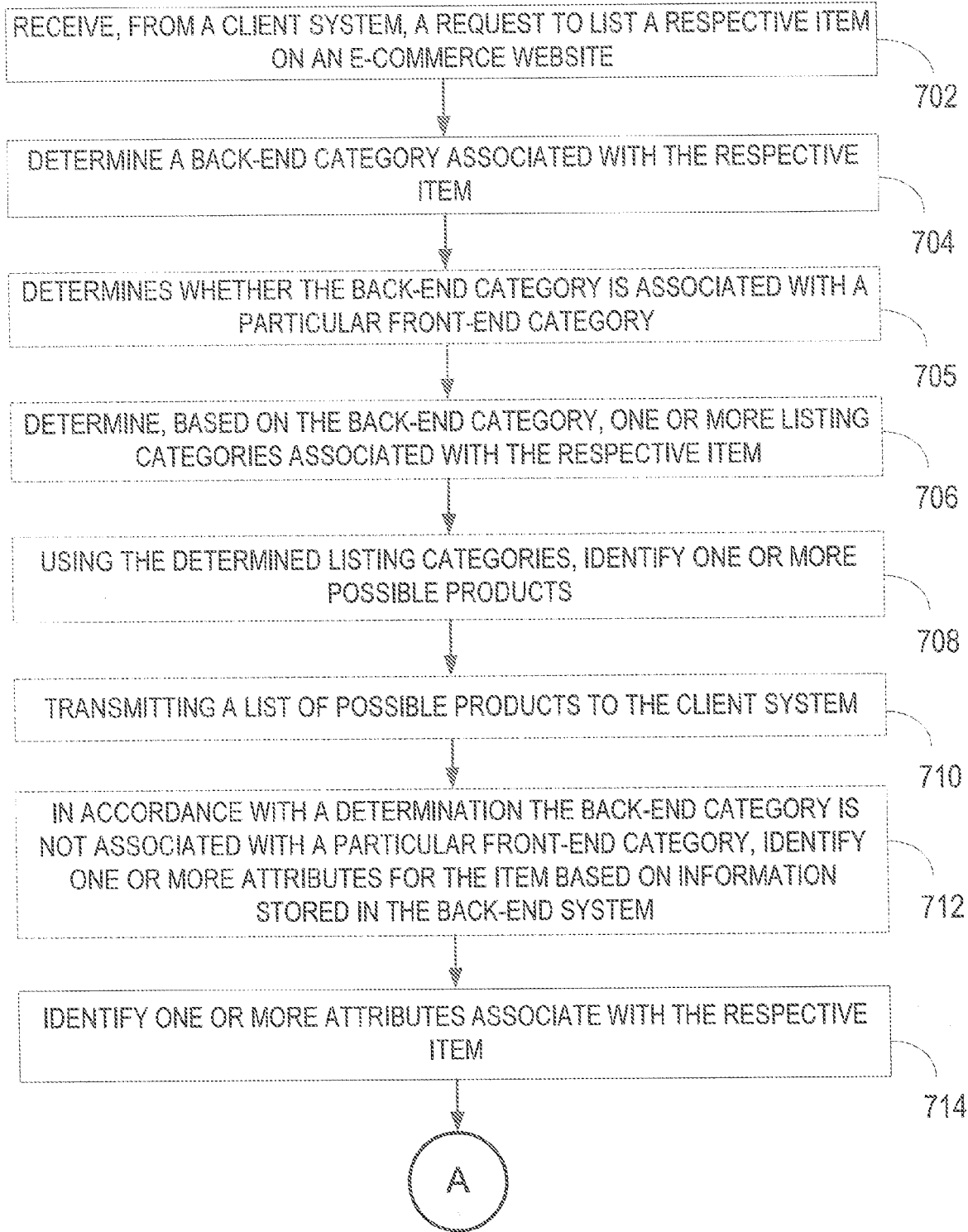
FIGS. 7A-7C is a flow diagram illustrating a method, in accordance with some example embodiments, for organizing item listings in an efficient product listing system.

FIG. 7A is a flow diagram illustrating a method, in accordance with some example embodiments, for organizing item listings in an efficient product listing system. Each of the operations shown in FIG. 7A may correspond to instructions stored in a computer memory or computer-readable storage medium. Optional operations are indicated by dashed lines (e.g., boxes with dashed-line borders). In some embodiments, the method described in FIG. 7A is performed by the server system (e.g., server system 120 in FIG. 1). However, the method described can also be performed by any other suitable configuration of electronic hardware.

In some embodiments the method is performed at a server system (e.g., server system 120 in FIG. 1) including one or more processors and memory storing one or more programs for execution by the one or more processors.

In some example embodiments, the server system (e.g., server system 120 in FIG. 1) receives (702), from a client system, a request to list a respective item on an e-commerce website. For example, a user wishes to sell a product on an e-commerce website. The client system (e.g., client system 102 in FIG. 1) associated with the user will send a request to the server system (e.g., server system 120 in FIG. 1) associated with the e-commerce website.

In other example embodiments, the request is automatically generated as part of an internal process to convert a plurality of stored item listings from a previous storage method to a new storage method. Thus, the server system (e.g., server system 120 in FIG. 1) starts a process to access and convert all the listings stored in the old format.

In some example embodiments, the request to list a specific item includes an item title. For example, the submitting user includes information about the item they wish to list including, but not limited to, a title, a description, an image, and so on.

In some example embodiments, the server system (e.g., server system 120 in FIG. 1) determines (704), using a processor of a machine associated with a server system, a back-end category associated with the respective item. In some example embodiments, the back-end category is determined based, at least in part, on the item title or other information associated with the request. In some example embodiments, the back-end category is an abstract product category used in a product-based data organizing system.

In some example embodiments, the server system (e.g., server system 120 in FIG. 1) determines (705) whether the back-end category is associated with a particular front-end category. In some example embodiments, each back-end category has been pre-associated (e.g., either automatically through text analysis or manually) with a particular front-end category (e.g., a meta category or leaf category).

In some example embodiments, the server system (e.g., server system 120 in FIG. 1), in accordance with a determination that the back-end category is associated with a particular front-end category, determines (706), based on the back-end category, one or more listing categories associated with the respective item. In some example embodiments, the one or more listing categories are associated with a user interface for an e-commerce system. Thus, a user interface for the e-commerce system allows a user to choose one or more broad categories that can be determined based on various factors including country, language, time of the year (e.g., in some situations certain categories are more prominent during certain times of year), and so on.

In some example embodiments, the server system (e.g., server system 120 in FIG. 1) identifies (708) one or more possible products using the determined listing categories. For example, the server system (e.g., server system 120 in FIG. 1) identifies a particular user interface category that is associated with the back-end category of the item identified in the request to be listed, and based on that user-interface category, identifies one or more similar products that fall within the particular user interface category.

In some example embodiments, the server system (e.g., server system 120 in FIG. 1) transmits (710) a list of possible products to the client system (e.g., client system 102 in FIG. 1). For example, the server system (e.g., server system 120 in FIG. 1) sends a message to the client system (e.g., client system 102 in FIG. 1) including a list of possible products (e.g., products that are within the same front-end category).

In some example embodiments, in accordance with a determination the back-end category is not associated with a particular front-end category, the server system (e.g., server system 120 in FIG. 1) identify (712) one or more attributes for the item based on information stored in the back-end system. In some example embodiments, this determination is based on stored information in the back end system or by text analysis.

In some example embodiments, the server system (e.g., server system 120 in FIG. 1) identities (714) one or more attributes associated with the respective item. Item attributes (e.g., sometimes called seller tags) describe one or more features of the item. As noted above, each product type will have a unique set of categories. Thus the set of attributes associated with the item only includes attributes that are applicable to that item.

Figure 7B:
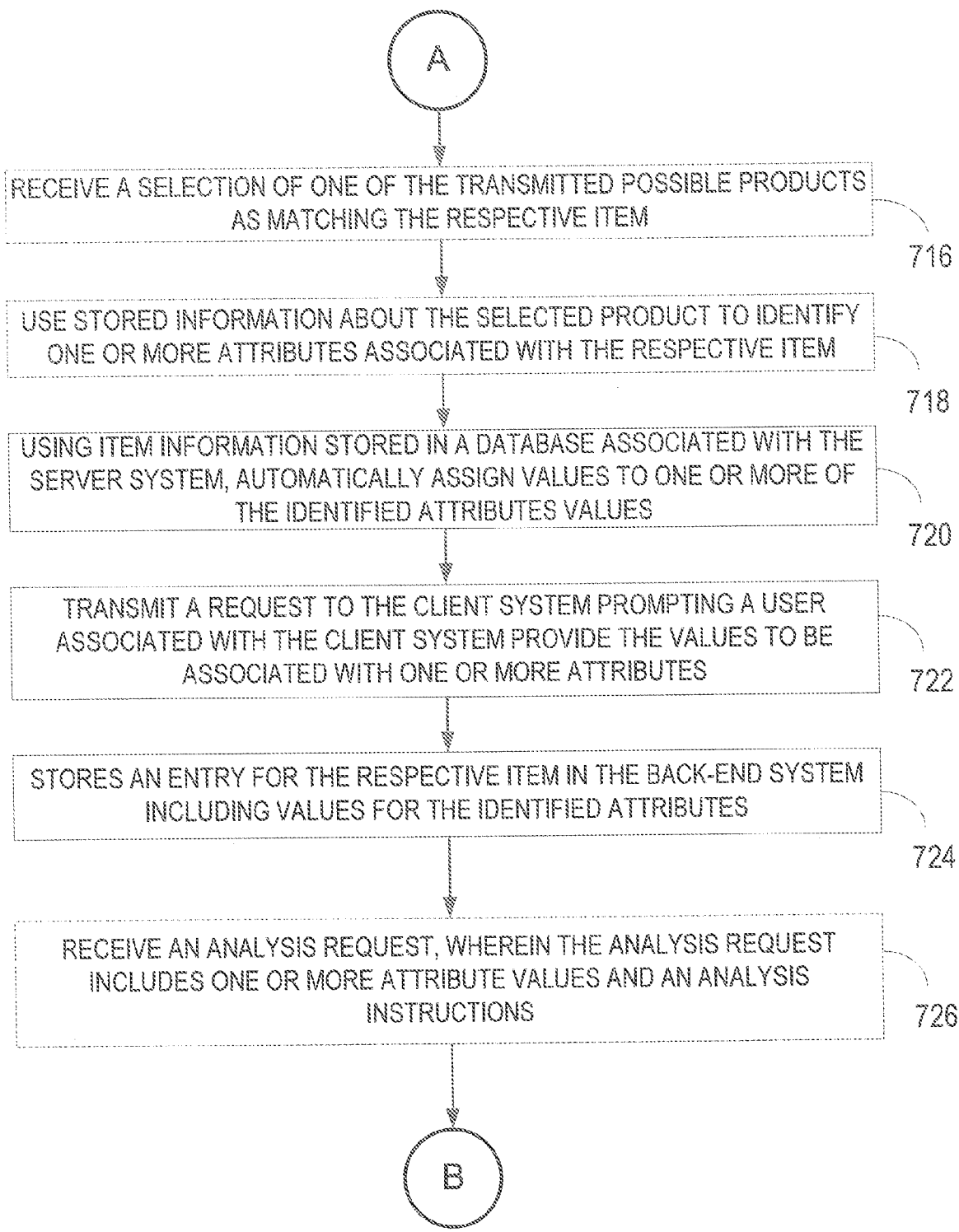

FIG. 7B is a flow diagram illustrating a method, in accordance with some example embodiments, for organizing item listings in an efficient product listing system. Each of the operations shown in FIG. 7B may correspond to instructions stored in a computer memory or computer-readable storage medium. Optional operations are indicated by dashed lines (e.g., boxes with dashed-line borders). In some embodiments, the method described in FIG. 7B is performed by the server system (e.g., server system 120 in FIG. 1). However, the method described can also be performed by any other suitable configuration of electronic hardware.

In some embodiments the method is performed at a server system (e.g., server system 120 in FIG. 1) including one or more processors and memory storing one or more programs for execution by the one or more processors.

In some example embodiments, the server system (e.g., server system 120 in FIG. 1) receives, from the client system (e.g., client system 102 in FIG. 1), a selection of one of the transmitted possible products as matching the respective item. For example, the server system (e.g., server system 120 in FIG. 1) has sent a prompt to the user including a plurality of products that are potential matches for the item referenced by the request to list an item and in response, the user has selected the matching product and transmitted that to the server system (e.g., server system 120 in FIG. 1).

In some example embodiments, the server system (e.g., server system 120 in FIG. 1) uses (718) stored information about the selected product to identify one or more attributes associated with the respective item. For example, the server system (e.g., server system 120 in FIG. 1) stores data (either associated with front-end categories or back-end categories or both) that describes what attributes apply to which items.

In some example embodiments, using item information stored in a database associated with the server system, the server system (e.g., server system 120 in FIG. 1) automatically assigns (720) values to one or more of the identified attributes values.

In some example embodiments, the server system (e.g., server system 120 in FIG. 1) transmits (722) a request to the client system prompting a user associated with the client system provide the values to be associated with one or more attributes. For example, there are one or more attributes that the server system (e.g., server system 120 in FIG. 1) cannot automatically fill (e.g., if the product has a unique serial number or one or more option features).

In some example embodiments, the server system (e.g., server system 120 in FIG. 1) stores (724) an entry for the respective item in the back-end system including values for the identified attributes.

Figure 7C:
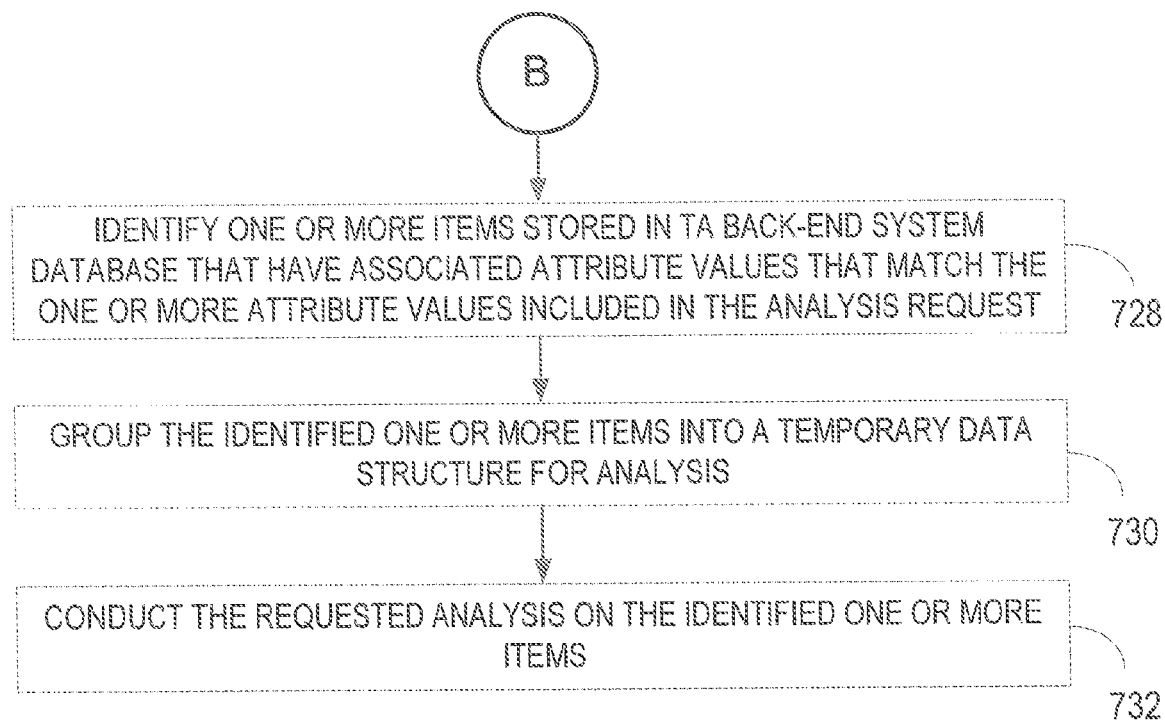

FIG. 7C is a flow diagram illustrating a method, in accordance with some example embodiments, for organizing item listings in an efficient product listing system. Each of the operations shown in FIG. 7C may correspond to instructions stored in a computer memory or computer-readable storage medium. Optional operations are indicated by dashed lines (e.g., boxes with dashed-line borders). In some embodiments, the method described in FIG. 7C is performed by the server system (e.g., server system 120 in FIG. 1). However, the method described can also be performed by any other suitable configuration of electronic hardware.

In some embodiments the method is performed at a server system (e.g., server system 120 in FIG. 1) including one or more processors and memory storing one or more programs for execution by the one or more processors.

In some example embodiments, the server system (e.g., server system 120 in FIG. 1) receives (726) an analysis request, wherein the analysis request includes one or more attribute values and an analysis instructions. For example, the request seeks items equivalent to a particular black dress. The request includes attributes associated with the dress including size, price, source, brand, and so on.

In some example embodiments, the server system (e.g., server system 120 in FIG. 1) identifies (728 one or more items stored in to back-end system database that have associated attribute values that match the one or more attribute values included in the analysis request. The server system (e.g., server system 120 in FIG. 1) groups (730) the identified one or more items into a temporary data structure for analysis. The server system (e.g., server system 120 in FIG. 1) conducts the requested analysis on the identified one or more items.

For example, a requested analysis includes a request to find an average price for a certain type of item. The request includes a list of attribute values and then returns an average price for items that have matching values. In another example, the server system server system 120 in FIG. 1) can determine one or more similar items. In another example, the system can determine whether a particular price is a good deal and send out recommendations based on that determination.

For example, to promote lower price items in the search result page, the request can determine, for given search criteria, which matching items have prices are below their median price.

In another example, to build a low-level analysis on item groupings with different granularities (different number of values combinations) to see gross merchandise volume or sold quantity. Similarly it is easy to set requests to measure price trends, search impression count, and so on without interfere by front-end redundant item mappings.

In another example, a request can calculate page views on different item groupings, or to bid some keywords on outside website (e.g., an outside search engine), to know which product categories and related attributes are more attractive and valuable for investment.

In some example embodiments, the party sending the request can determine how broad the pool of analyzed items is based on the number of attributes specified. By increasing the number of specified attributes, the pool of item (e.g., listing bucket) is smaller and more specific. However, a party can increase the total number of items analyzed by decreasing the number of attributes selected.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SanS). For example, at least some of the operations may be performed by a group of computers (as examples of machines including processors), with these operations being accessible via a network (e.g., the Internet) and via one or more appropriate interfaces an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 5-7 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 8:
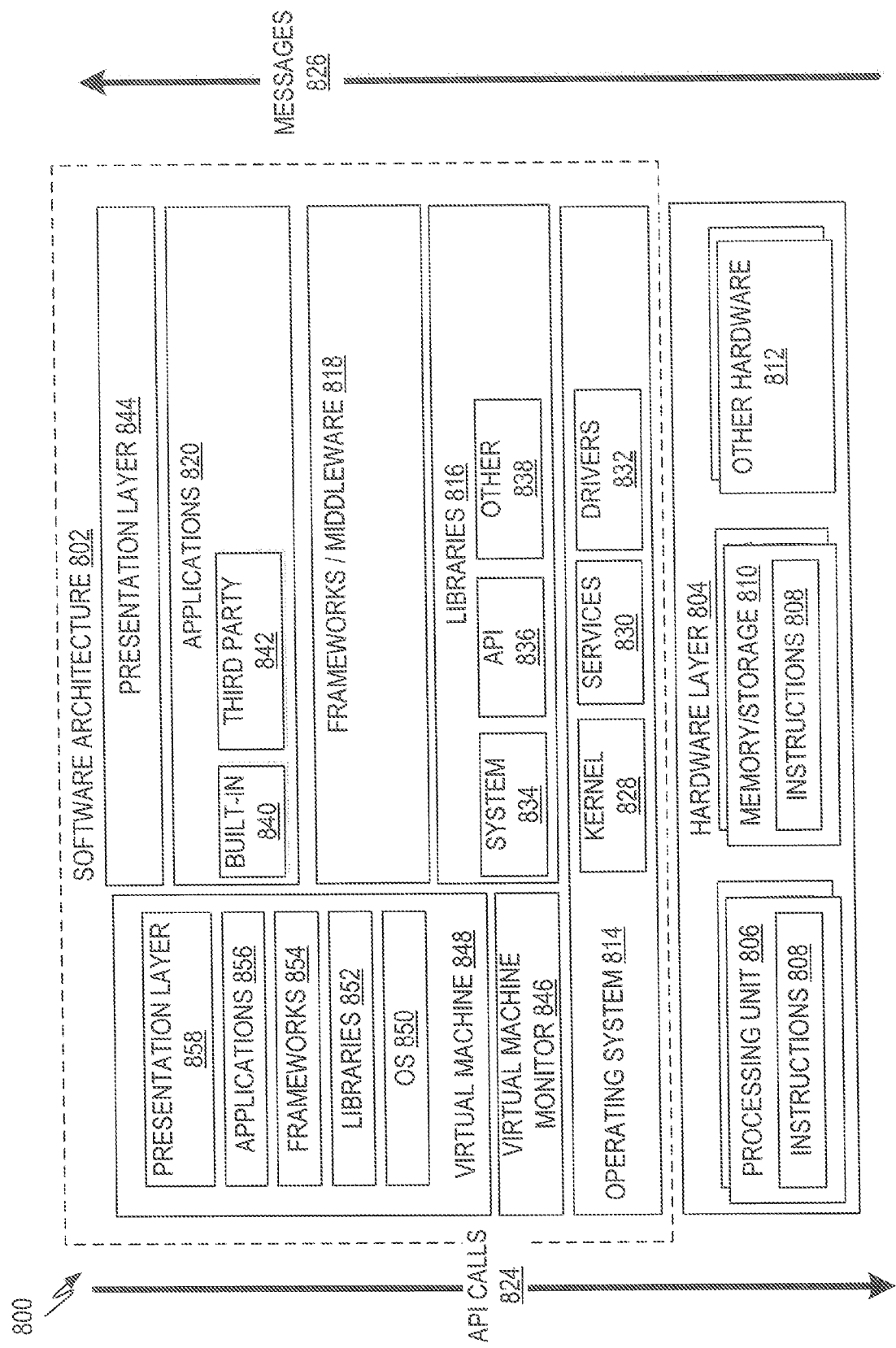
FIG. 8 is a block diagram illustrating an example of a software architecture that may be installed on a machine, according to some example embodiments.

FIG. 8 is a block diagram 800 illustrating a representative software architecture 802, which may be used in conjunction with various hardware architectures herein described. FIG. 8 is merely a non-limiting example of a software architecture 802 and it will be appreciated that many other architectures may be implemented to facilitate the functionality described herein. The software architecture 802 may be executing on hardware such as machine 900 of FIG. 9 that includes, among other things, processors 910, memory/storage 930, and I/O components 950. A representative hardware layer 804 is illustrated and can represent, for example, the machine 900 of FIG. 9. The representative hardware layer 804 comprises one or more processing units 806 having associated executable instructions 808. Executable instructions 808 represent the executable instructions of the software architecture 802, including implementation of the methods, modules and so forth of FIG. 5-7. Hardware layer 804 also includes memory and/or storage modules 810, which also have executable instructions 808. Hardware layer 804 may also comprise other hardware 812, which represents any other hardware of the hardware layer 804, such as the other hardware illustrated as part of machine 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820 and presentation layer 844. Operationally, the applications 820 and/or other components within the layers may invoke application programming interface (API) calls 824 through the software stack and receive a response, returned values, and so forth illustrated as messages 826 in response to the API calls 824. The layers illustrated are representative in nature and not all software architectures have all layers. For example, some mobile or special purpose operating systems may not provide a frameworks middleware 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware 818 (also sometimes referred to as middleware) may provide a higher-level common infrastructure that may be utilized by the applications 820 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 820 and/or other software components/modules, some of which may be specific to a particular operating system or platform.

The applications 820 include built-in applications 840 and/or third party applications 842. Examples of representative built-in applications 840 may include, but are not limited to, a contacts application, a browser application, a book reader application, a location application, a media application, a messaging application, and/or a game application. Third party applications 842 may include any of the built in applications 840 as well as a broad assortment of other applications. In a specific example, the third party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 842 may invoke the API calls 824 provided by the mobile operating system such as operating system 814 to facilitate functionality described herein.

The applications 820 may utilize built-in operating system functions (e.g., kernel 828, services 830 and/or drivers 832), libraries (e.g., system libraries 834, API libraries 836, and other libraries 838), frameworks/middleware 818 to create user interfaces to interact with users of the system. Alternatively, or additionally, in some systems, interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware machine (such as the machine of FIG. 9, for example). A virtual machine is hosted by a host operating system (operating system 814 in FIG. 8) and typically, although not always, has a virtual machine monitor 846, which manages the operation of the virtual machine 848 as well as the interface with the host operating system (i.e., operating system 814). A software architecture executes within the virtual machine 848 such as an operating system 850, libraries 852, frameworks 854, applications 856 and/or presentation layer 858. These layers of software architecture executing within the virtual machine 848 can be the same as corresponding layers previously described or may be different.

Example Machine Architecture and Machine-Readable Medium

Figure 9:
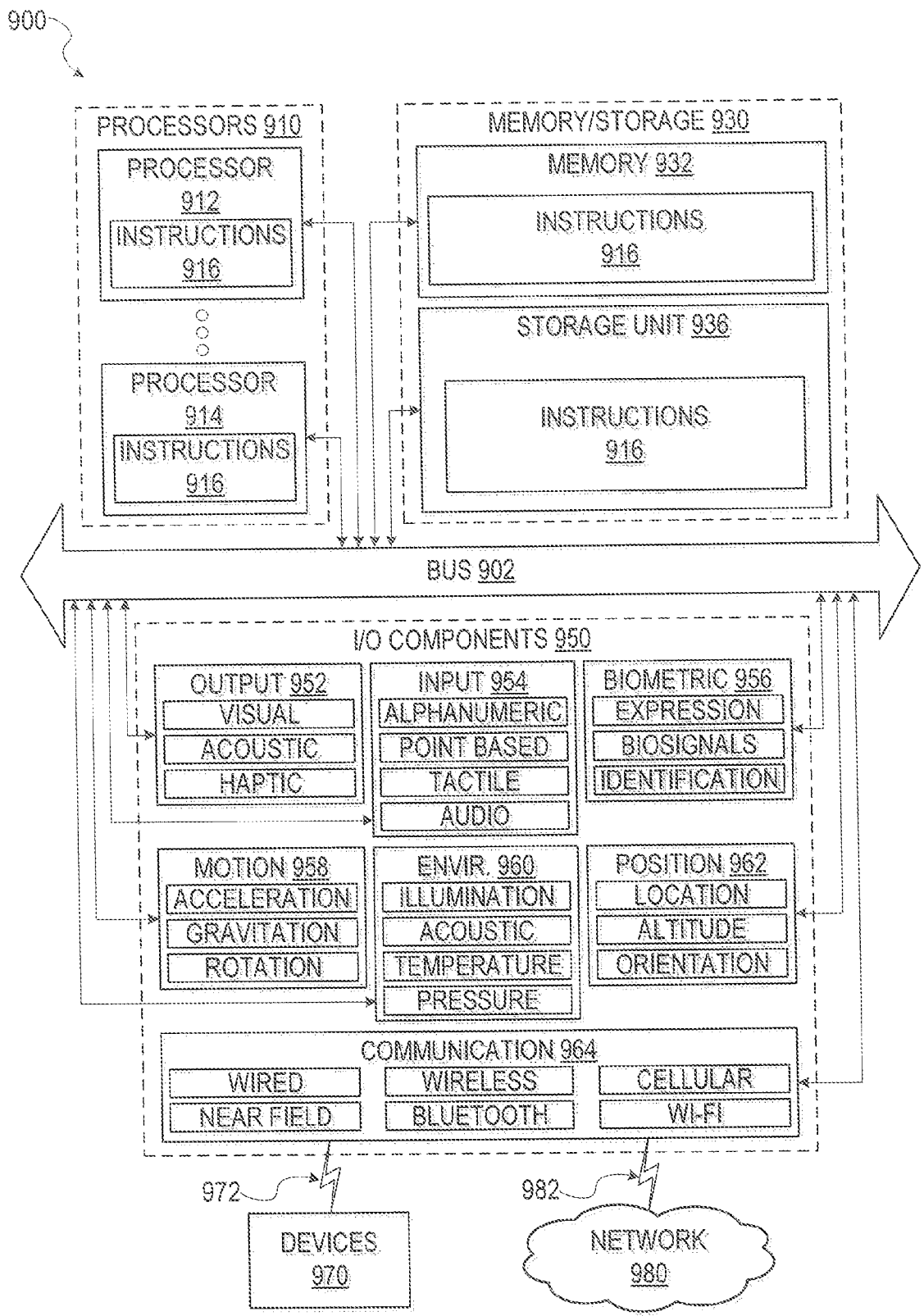
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute the flow diagrams of FIGS. 5-7. The instructions 916 transform the general, non-programmed machine 900 into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RTIC), another processor, or any suitable combination thereof) may include, for example, processor 912 and processor 914 that may execute instructions 916. The term "processor" is intended to include multi-core processor that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core process), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of processors 910 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 916. The term. "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972 respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as, location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   one or more computer processors;
   one or more computer memories;
   one or more back-end structured item organizing modules incorporated into the one or more computer memories, the one or more back-end structured item organizing modules associated with a front-end category mapping system and configuring the one or more computer processors to process a use case request and to perform operations comprising:
      receiving the use case request, the use case request identifying an item for classification by the one or more back-end structured item organizing modules;
      identifying a use case from the use case request;
      selecting a listing bucket from a plurality of listing buckets of the one or more back-end structured item organizing modules, the selected listing bucket corresponding to the use case based on a set of attribute values included in the use case request; and
      causing a user interface of the front-end category mapping system to display one or more item characteristics associated with items categorized within the selected listing bucket.

2. The system of claim 1, wherein each listing bucket of the plurality of listing buckets is a data structure that includes one or more back-end categories of the one or more back-end structured item organizing modules that match the set of attribute values included in the use case request.

3. The system of claim 1, wherein the use case corresponds to one or more attribute pools determined from one or more back-end categories of the one or more back-end structured item organizing modules.

4. The system of claim 3, wherein each of the one or more attribute pools corresponds to one of the one or more back-end categories.

5. The system of claim 1, wherein the item is associated with a single back-end category of the one or more back-end structured item organizing modules and the item is associated with a plurality of front-end categories of the front-end category mapping system.

6. The system of claim 1, wherein a number of items analyzed is determined by increasing a number of attribute values in the set of attribute values.

7. The system of claim 1, wherein the use case request pertains to matching the item to additional items stored by the one or more back-end structured item organizing modules that have prices below a median price and the user interface presents the additional items.

8. A method comprising:
   performing operations to process a use case request at a back-end structured item organizing system associated with a front-end category mapping system, the operations comprising:
      receiving a use case request, the use case request identifying an item for classification by the back-end structured item organizing system;
      identifying a use case from the use case request;
      selecting a listing bucket from a plurality of listing buckets of the back-end structured item organizing system, the selected listing bucket corresponding to the use case based on a set of attribute values included in the use case request; and causing a user interface of the front-end category mapping system to display one or more item characteristics associated with items categorized within the selected listing bucket.

9. The method of claim 8, wherein each listing bucket of the plurality of listing buckets is a data structure that includes one or more back-end categories of the back-end structured item organizing system that match the set of attribute values included in the use case request.

10. The method of claim 8, wherein the use case corresponds to one or more attribute pools determined from one or more back-end categories of the back-end structured item organizing system.

11. The method of claim 10, wherein each of the one or more attribute pools corresponds to one of the one or more back-end categories.

12. The method of claim 8, wherein the item is associated with a single back-end category of the back-end structured item organizing system and the item is associated with a plurality of front-end categories of the front-end category mapping system.

13. The method of claim 8, wherein the use case request pertains to matching the item to additional items stored by the back-end structured item organizing system that have prices below a median price and the user interface presents the additional items.

14. A non-transitory machine-readable medium storing a set of instructions that, when executed by one or more computer processors, cause the one or more computer processors to perform operations for processing a use case request at a back-end structured item organizing system associated with a front-end category mapping system, the operations comprising:

receiving a use case request, the use case request identifying an item for classification by the back-end structured item organizing system;

identifying a use case from the use case request;

selecting a listing bucket from a plurality of listing buckets of the back-end structured item organizing system, the selected listing bucket corresponding to the use case based on a set of attribute values included in the use case request; and causing a user interface of the front-end category mapping system to display one or more item characteristics associated with items categorized within the selected listing bucket.

15. The non-transitory machine-readable medium of claim 14, wherein each listing bucket of the plurality of listing buckets is a data structure that includes one or more back-end categories of the back-end structured item organizing system that match the set of attribute values included in the use case request.

16. The non-transitory machine-readable medium of claim 14, wherein the use case corresponds to one or more attribute pools determined from one or more back-end categories of the back-end structured item organizing system.

17. The non-transitory machine-readable medium of claim 16, wherein each of the one or more attribute pools corresponds to one of the one or more back-end categories.

18. The non-transitory machine-readable medium of claim 14, wherein the item is associated with a single back-end category of the back-end structured item organizing system and the item is associated with a plurality of front-end categories of the front-end category mapping system.

19. The system of claim 1, wherein the items categorized within the selected listing bucket are mapped to one or more front-end categories of the front-end category mapping system.

20. The system of claim 19, further comprising:

causing, via the user interface of the front-end category mapping system, to display the one or more front-end categories;

receiving, via the user interface of the front-end category mapping system, a selection of a first front-end category of the one or more front-end categories based at least in part on displaying the one or more front-end categories; and returning a search result page comprising the item in response to a request corresponding to the first front end category.

* * * * *